(12) United States Patent
Gremmelmaier

(10) Patent No.: US 6,308,267 B1
(45) Date of Patent: Oct. 23, 2001

(54) ARRANGEMENT AND METHOD FOR MOBILE COMMUNICATIONS HAVING AN IP LINK

(75) Inventor: Ulrich Gremmelmaier, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/572,547

(22) Filed: May 15, 2000

(30) Foreign Application Priority Data

May 14, 1999 (DE) ............................................. 199 22 288

(51) Int. Cl.$^7$ .................................................. G06F 12/14
(52) U.S. Cl. .......................................... 713/168; 370/329
(58) Field of Search .................................. 713/200, 201, 713/202, 151, 152, 153, 168; 455/53.1, 404, 54.1, 54.2; 320/433, 329, 354

(56) References Cited

U.S. PATENT DOCUMENTS

| | | | |
|---|---|---|---|
| 4,768,190 | * | 8/1988 | Giancardo ............................... 370/86 |
| 5,778,075 | * | 7/1998 | Haartsen ............................... 713/168 |
| 5,991,407 | * | 11/1999 | Murto ............................... 713/168 |
| 6,161,008 | * | 12/2000 | Lee et al. ............................... 455/414 |
| 6,222,829 | * | 4/2001 | Karlson et al. ....................... 370/329 |

FOREIGN PATENT DOCUMENTS

| | | |
|---|---|---|
| 295 11 856 | 11/1995 | (DE) . |
| 196 52 658 | 6/1998 | (DE) . |
| 197 22 424 | 6/1998 | (DE) . |
| 198 01 769 | 7/1998 | (DE) . |
| 197 30 159 | 1/1999 | (DE) . |
| 197 35 191 | 2/1999 | (DE) . |
| 197 28 033 | 8/1999 | (DE) . |
| 0 996 295 | 10/1998 | (EP) . |
| WO 98/43446 | 10/1998 | (WO) . |
| WO 99/05830 | 2/1999 | (WO) . |
| WO 99/20021 | 4/1999 | (WO) . |

OTHER PUBLICATIONS

"Firewall Systeme," Pohlman, Funkschau, vol. 17, (1998) pp. 63–67.
Ericsson advertisement "Der Handheld Computer MC 16 und das Ericsson–Handy SH 888," Funschau, vol. 20 (1998).
"PDA—die neue Generation," Lauer, Funkschau vol. 7, (1997) pp. 78–81.
"FMC–jetzt wächst zusammen, was zusammengehört," Willamowski, Ik, Berlin 48 (1998) pp. 32–35.
"Mobilität in Firmen: Marktanforderungen und Lösungen," Dru et al., Alcatel Telecom Rundschau, 3. Quartal (1997).
"Drahtlos zum Freizeichen," Reiss, telecom report, vol. 18, No. 1, (1995) pp. 34–37.
Abstract for Japanese Application 0010224853 AA, published Aug. 21, 1998.

* cited by examiner

Primary Examiner—James P. Trammell
Assistant Examiner—Pierre Eddy Elisca
(74) Attorney, Agent, or Firm—Schiff Hardin & Waite

(57) ABSTRACT

An arrangement and method for mobile communication that includes at least one mobile radio network and at least one mobile radio terminal device, wherein an IP-network is linked with the mobile radio network via a network coupling unit. The IP-network, in particular, includes a mobility server for the administration of mobility-specific subscriber data.

8 Claims, 3 Drawing Sheets

—|— MAP over IP

—‖— MPS CONTROL

—∰— SERVER-SPEC. PROTOCOL

MLR  HOME LOCATION REG.

VLR  VISITOR LOCATION REG.

AUC  AUTHENTICATION

ARRANGEMENT AND METHOD FOR MOBILE COMMUNICATIONS HAVING AN IP LINK

BACKGROUND OF THE INVENTION

The invention concerns an arrangement and method for mobile communications utilizing a mobility server to enable matching of formats of an IP-network that is linked to a mobile radio network.

Mobile communication and computer-supported communication via Internet have, in a short time, become important determinants of social life and driving forces of economic development in all developed countries. In both fields, global markets with huge potential for development have formed within a very short time out of a rapidly transpiring process of innovation.

The effects of certain limitations are already noticeable today in spite of the comparatively high speed with which the extremely complex standards currently applied (e.g., GSM) were developed and established, and with which future standards (e.g., UMTS) are being developed, and also in spite of the considerable market success of the present systems,. Thus, there is still significant potential for simplification of mobile communication given the broad, international global use (also characterized as "roaming".) So far, there have been limitations and difficulties in the use of the constantly and dramatically expanding opportunities of the Internet for subscribers of the mobile radio networks.

The merging of technologies of public mobile radio networks and the Internet harbors a high potential for innovation with respect to new network architectures and cost-efficient products. In this context, new architectures and protocols for mobility administration are of particular significance.

SUMMARY OF THE INVENTION

The invention is therefore based on an object to indicate an arrangement for mobile communication, with which a simplified roaming of subscribers of the mobile communication also becomes possible between the Internet (IP-network) and the public mobile radio network, and that contributes overall to a simplification of global voice and data communication.

This and other objects are attained according to an embodiment of the present invention including at least one mobile radio network, one mobile radio terminal device and an IP-network having the mobility server configured to administer mobility specific subscriber data. The mobility server is further configured to format match at least one of various particles, addressing schemes and name schemes of at least one of the IP-network and the mobile radio network.

The invention includes the fundamental technical concepts to realize an IP-based arrangement that can be accessed both for IP-based mobile stations (hereinafter also referred to as "IP-MS") as well as for mobile stations (also referred to as "MS") according to the conventional mobile radio standard and wherein roaming is realized using a specific mobility server (hereinafter also referred to as MPS=mobility proxy server) that is allocated to the IP-network provided therein.

The mobile stations of the individual subscribers, whether mobile computers or mobile telephones, obtain access to an IP-network via a radio access network (also referred to as RAC=radio access network). Via the RAC access is possible to a public mobile radio network (hereinafter also referred to as PLMN=public land mobile network), the GSM- network or the future UMTS-network. Of course, direct access of a conventional mobile station (mobile telephone) to the PLMN is also possible in the conventional manner.

An essential function of the mobility server (MPS) is the administration of mobility-specific subscriber data (given integration of local data bases (HLR(IP)=home location register (IP)). Another function of the MPS is a facilitator having a uniform protocol interface between a network coupling unit (access server/IWU=interworking unit) or a visitor location register (IP)=(VLR(IP)) and the mobility-specific subscriber data. Yet another function of the MPS is the scheduling of the protocol sequence between the components involved. Also, the MPS functions to format match between different addressing and name schemes as well as different protocols of the IP-network and connected networks (mobile radio networks or also company networks LAN=local area networks). Furthermore, the MPS can administer security-related subscriber data (authentication data) that are held in a specific data base in particular (AUC=authentication).

The proposed arrangement in a preferred embodiment specifically for large networks having a large number of subscribers can comprise data base servers for linking mobility servers with the local data bases.

In addition to the recited administration functions, there is an important function of the mobility server in another embodiment for the conversion of network access identifiers (NAI=network access identifier) transmitted by the connected data terminals into IP-addresses, wherein a separation of mobile subscriber identification and network addressing is attained in an advantageous manner.

An advantage of the architecture outlined above lies in the separation of data bank functions (e.g., subscriber administration, HLR) from the protocol conversion and addressing. This separation namely enables one to leave the exact methods of the data access invisible in the interest of the increase in data security of the system for the client who makes inquiries at the MPS. A further significant advantage of the architecture lies in its modularity affording protocol changes at an interface that are basically limited to the interface and not necessarily affect others.

Scalability of the system can be easily achieved in an embodiment having proxy-mechanisms support of a hierarchic proxy server design (that is already known as such from the Internet practice).

The extensive use of open interfaces enables the relatively simple use of (in the sense of the IETF) standardized server protocols (e.g., the protocol RADIUS or gatekeeper). Hence, the use of these network components remains possible, now as before, for the implementation of the tasks previously assigned to them by design.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly point out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE PREFERRED EMBODIMENTS

Figure 1:
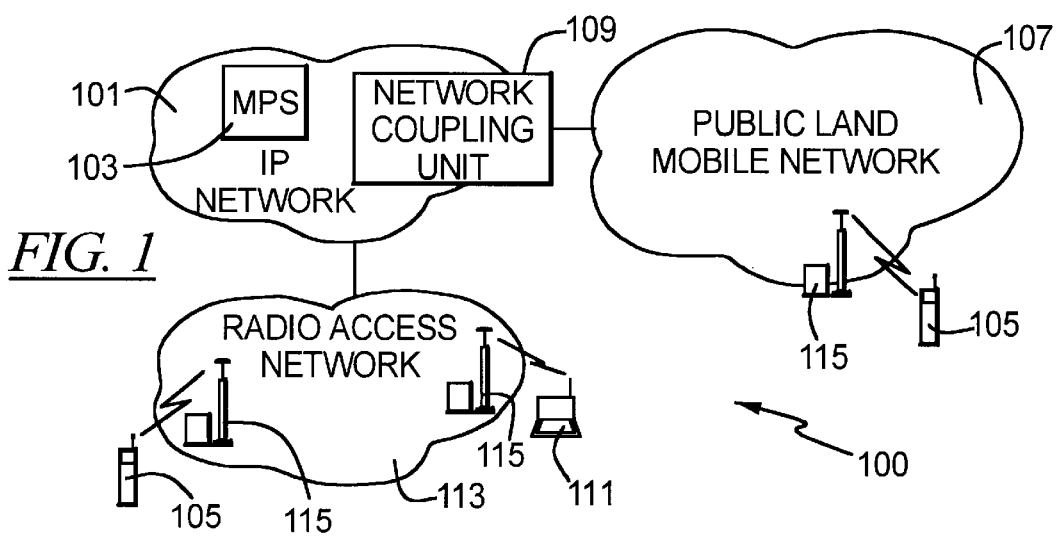
FIG. 1 illustrates a schematic diagram (network scenario) of an embodiment as an overview representation.

FIG. 1 is a schematic illustration showing the principle of a network configuration shown generally at 100 according to the present invention that is particularly important economically-speaking, the crux of which an IP-network 101 having a mobility server 103 fashioned as the proxy server being of primary significance. Mobile telephones 105 can obtain access to the IP-network 101 via a network coupling unit 109 on the one hand via a conventional mobile radio network (PLMN) 107 (e.g., a GSM-network or the prospective UMTS-network). On the other hand, a specific radio access network (RAC) 113 is provided for the connection of both mobile telephones 105 as well as of mobile data terminals 111 with the IP-network 101. Base stations 115 communicating with the mobile telephones 105 and also with the mobile data terminal 111 are provided both in the public mobile radio network 107as well as in the specific radio access network 113.

Figure 2:
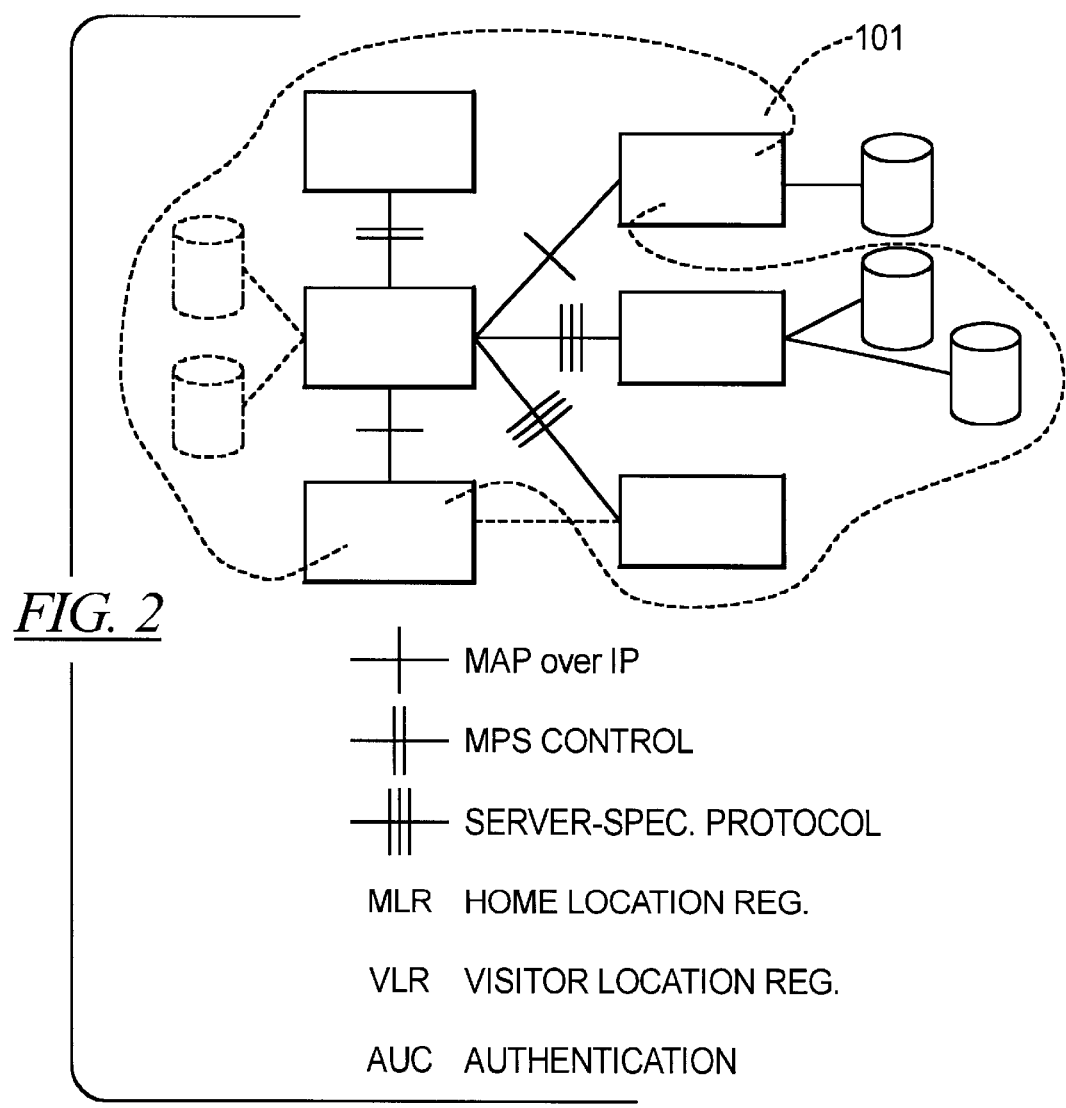
FIG. 2 shows a schematic illustration of the architecture and interfaces of a mobility server of the arrangement according to FIG. 1.

FIG. 2 shows the architecture and interfaces of the mobility server 103 according to FIG. 1. Its connection with the public mobile radio network ensues (as already diagramed in FIG. 1) via the network coupling unit 109 that is allocated to a home location register (HLR) 109a in the (not shown here) mobile radio network according to conventional techniques. Within the IP-network 101, an HLR-server 103.1 is allocated to the mobility server 103, via which an IP-network internal data base HLR (IP) 103.2 and an IP-network internal authentication data base (AUC) 103.3 are administered. Data bases 103.2' or respectively, 103.3' can be optionally connected to the mobility server 103 directly even without interposition of an HLR-server. Furthermore, a visitor location register of the IP-network (VLR(IP)) 103.5 can be optionally administered (shown in the FIG. by a dotted line) via a radio access server 103.4 which administers the access to the RAC 113 (FIG. 1) and is allocated to the mobility server 103. The solid connecting line in FIG. 2 between the mobility server 103 and the VLR(IP)) 103.5 indicates that the direct allocation of the VLR(IP)) to the mobility server is the preferred one. The representation of a second MPS 103' is intended to show that the proposed network structure can also comprise several mobility servers.

In the Figure, those blocks that represent components belonging to the IP-network are arranged completely within the dotted line symbolically limiting the IP-network 101, whereas the two interfaces 109 and 103.4 are identified as coupling units by means of a diagonal subdivision and their arrangement on the dotted line. The access server (IWU) 103.4 terminates the protocols and interfaces specific for the radio access network. Whenever a mobile station is active, it administers, for example, a "tunnel" or a "session" to the corresponding mobile station 105, or respectively, a data terminal 111. Furthermore, the delivery of registration and authentication information as well as what are referred to as location management reports to the MPS 103 falls to the lot of the access server 103.4 as a sub-task in the scope of the mobility administration.

Whenever, for example, a GSM-mobile telephone 105 (FIG. 1) is connected via the radio access network, a specific code (i.e., what is referred to as the IMSI (international mobile subscriber identity)) that is established in the GSM-protocol is transmitted by the phone 105 to the MPS 103 via the access server 103.4. In the event that an IP-based mobile data terminal 111 (FIG. 1) is connected at the radio access network, the NAI is additionally transmitted to the MPS 103 along with this IMSI-identifier. This is fashioned for the processing of both identifiers, whereby identifiers belonging together IMSI-NAI are stored in an allocation table. This allocation table can be expanded for the acceptance of other data (e.g., call numbers). The access server 103.4 itself is, as becomes apparent already from the Figure connected at the IP-network 101 and has a known address there.

The MPS 103 administers mobility-specific and security related subscriber data according to the architecture shown in FIG. 2, said data being stored in the data bases HLR (IP) or AUC. The function of the HLR (IP) 103.2 corresponds to the function of an HLR in a conventional mobile radio network. The data for the subscriber authentication are held stored in the separate data base 103.3. The HLR-server 103.1 shown in FIG. 2 is optionally connected as a front-end for the actual data bank. It can be realized, for example, on the basis of a RADIUS-server. The MPS 103 carries out the protocol adaptation to the HLR (IP).

The VLR (IP) contains temporary subscriber identifiers specific to the location and cryptographic data, what are referred to as TMSI (temporary mobile subscriber identity) for GSM-mobile stations, for example. The VLR (IP) shown here as a separate block can also be integrated in the access server 103.4. Typically, the VLR(IP) is allocated to a certain area of the radio access network 113. Given a location change of the subscriber to a new VLR (IP), outdated location-specific data are either transferred from the MPS 103 to a new "responsible" VLR (IP) and then deleted from the MPS in the previous VLR(IP), or they are automatically deleted on the basis of an internal time control in the previously responsible VLR(IP). The latter possibility would, of course, then affect all data of the VLR(IP) and presupposes that the MPS 103 periodically renews or refreshes all location-specific and still current information.

The PLMN-gateway 109 assumes the transmission of signal reports from the public mobile radio network 107 (FIG. 1) into the IP-network 101 or the reverse, in particular for the HLR 109a, wherein the updating of location specific and other subscriber data (what is referred to as "location update") between the IP-network and the public network is enabled.

The protocols indicated in the box at the bottom right in FIG. 2 are used on the interfaces: "MAP over IP" or "mobility proxy server control protocol (MPSCP)". "MAP over IP" essentially transports mobility-specific and security-related data and resumes on SCCP. "MSCSP" serves for the forwarding of inquiries and for the load sharing given large networks. In the event that several MPS are employed for an IP-network as symbolized in FIG. 2 by the MPS 103 and 103', the MPS's are organized in a hierarchy that is structured according to the Domain Name System. The address and location of the MPS in the hierarchy can be derived from the domain-specific part of the NAI. Since the HLR(IP) 103.2 and VLR(IP) 103.5 can be realized on the basis of standard components like RADIUS-servers or gatekeepers, the MPS 103 can support corresponding protocol specific adaptations at these interfaces. The "MSCSP" can be realized as a client server protocol, which serves as a container protocol for inquiries at the servers that continue collaborating for answers from these.

Figure 3:
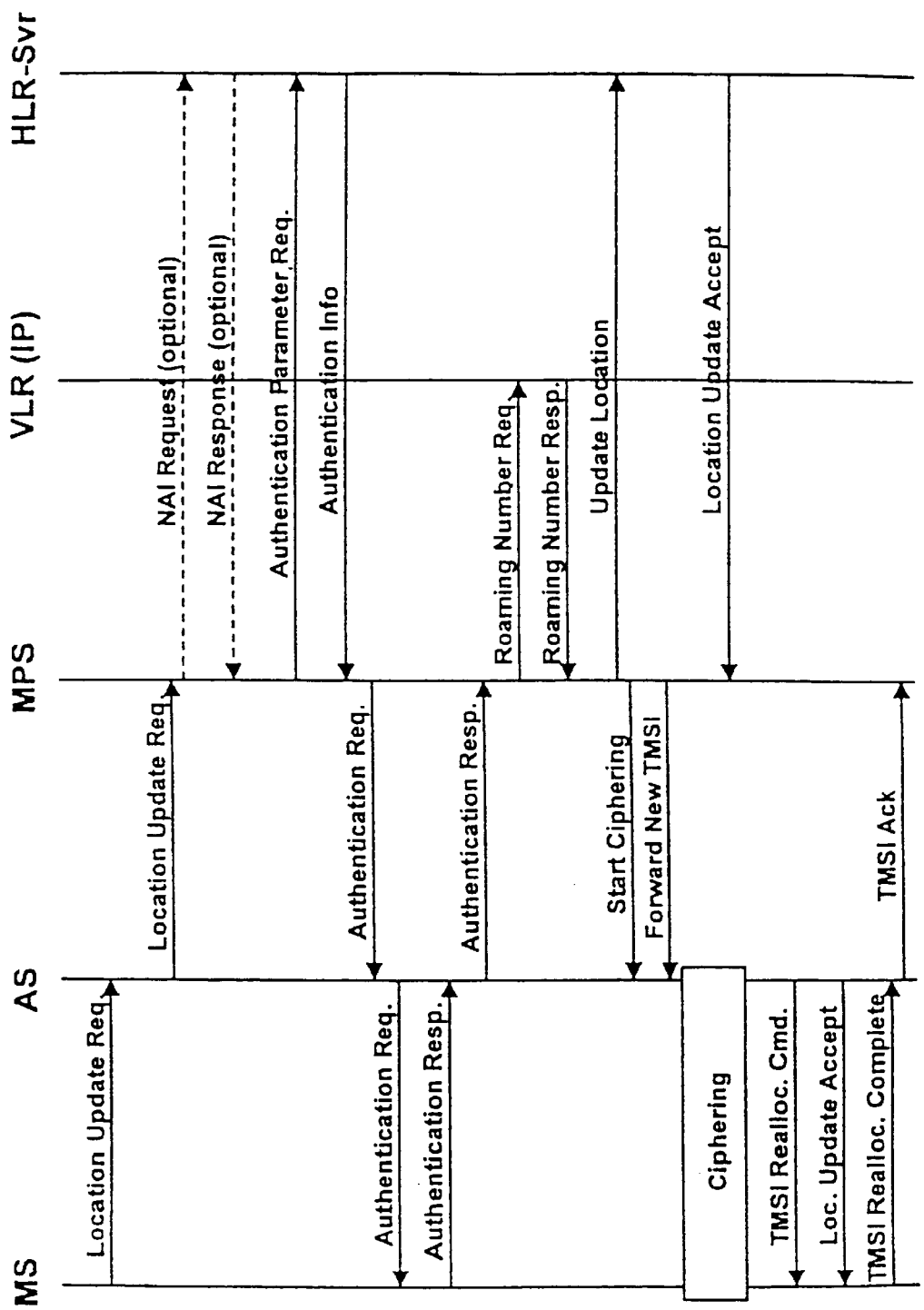
FIG. 3 shows a schematic illustration of the executive sequence given a location registration.

According to a preferred embodiment shown in FIG. 3, a location registration event is diagramed according to a GSM-protocol for a GSM-radio access network having GSM-mobile stations and HLR-servers (without a direct PLMN-link). It is noted that the AUC-function is not explained in detail in either the FIG. or in the following. The sequence of FIG. 3 starts with mobile station (MS) sending a location update request to the access server/ IWU and thereby transmits the IMSI. Access server/IWU then forwards the location update request (and the IMSI) on to the MPS.

The MPS determines the NAI on the basis of the IMSI for this subscriber and stores the allocation in a table. The NAI can be determined in two ways: 1) It is freely assigned; or 2) it is queried by the HLR-server (compare section 3: NAI request or response). The MPS sends an authentication parameter request to the HLR-server. The MPS transmits the authentication information from the HLR-server as the authentication request to the access server/IWU and mobile station.

The mobile station answers the MPS with an authentication response after a successful authentication procedure (not shown in FIG. 3). In turn the MPS queries a mobile station roaming number (MSRN) at the VLR(IP) with a roaming number request. The VLR(IP) is realized in this case by means of a gatekeeper, which administers the allocation MSRN-IP-address (of the access server/IWU). After receiving the roaming number response, the MPS additionally inserts the MSRN into the allocation table IMSI-NAI.

Next, the MPS sends subscriber data to the HLR server (IMSI; mobile station roaming number) via the update location and starts the payload data encryption (Start Ciphering). The MPS generates the TMSI (instead of the VLR(IP)) and sends it to the mobile station (forward new TMSI). The HLR-server confirms the entry of the subscriber data (location update accept). The MPS access server transmits the TMSI to the mobile station (TMSI relocation command) and sends a location update accept to the access server/IWU. Confirmation is then sent by the mobile station access server/IWU (TMSI relocation complete, TMSI ack).

An advantage of the MPS primarily becomes clear then with respect to the use of the NAI, whenever the mobile station is IP-based. Then the NAI is delivered directly from the mobile station to the MPS that derives from the NAI, with the aid of the Domain Name system, the IP-address, the "proper" hierarchic level and the HLR server to be addressed. Advantages are also realized whenever the NAI is used for the determination of the IP-address of the respective MPS (given a hierarchic design) and, thus, of the HLR-server.

Figure 4:
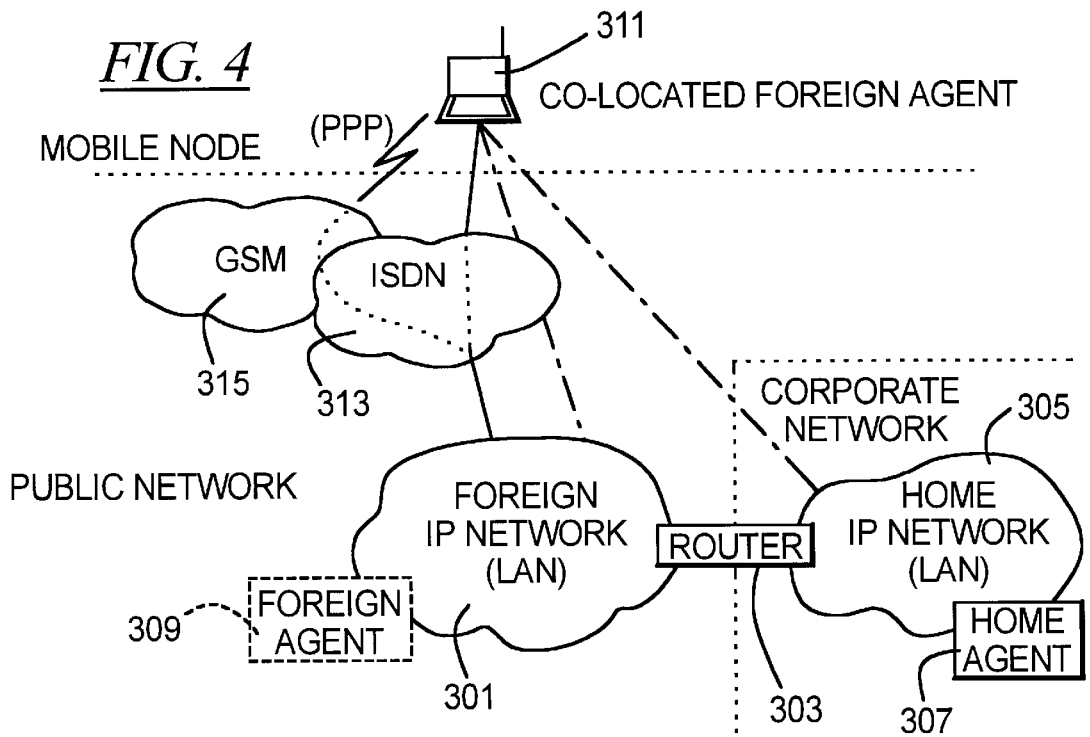
FIG. 4 illustrates a schematic diagram (network scenario) of another embodiment of the present invention.

FIG. 4 diagrams a further network structure according to another embodiment of the invention. Here, an important feature is an IP-network 301 fashioned as a LAN (local access network) that is linked via a router 303 to a company's own IP-network 305 also fashioned as a LAN. Via the connection of both networks together, a connection can be produced between a "home agent" 307 connected to the company's own network and a "foreign agent" 309 connected to the foreign network. Using both networks 301 and 305, a data terminal 311 of what is referred to as a "co-located foreign agent" can be connected via a radio link.

Further, this data terminal 311 is connected to the foreign IP-network 103 via a ISDN-network 313, and a further connection to the foreign network 301 exists between the data terminal 311 and the ISDN-network 313, via a public mobile radio network 315 according to the GSM-standard.

In addition to the illustration of the important functions "home agent" and "foreign agent", an aspect of the arrangement according to FIG. 4 that is relevant in the context of the present invention is the possibility of a wireless connection of a mobile station with a company network either via Ethernet or by dialing into the ISDN or GSM via the mobile node. The configuration shown here is also a useful test-configuration for preparing the implementation of the arrangement according to FIG. 1. For the support of the automatic user transparent exchange between various access options, a specific mobility manager is implemented for the mobile node that dictates, as warranted, the loss of a carrier (e.g., an interruption of the connection of the mobile node to the Ethernet of the company's own network) and initiates automatic switching to another access carrier (e.g., to a GSM supported connection). As soon as the new carrier is available, the protocol initiates a forwarding of the data packet to the new address. The carrier-detection is preferentially implemented with an optimized DHCP (dynamic host configuration protocol) which is a client implementation that checks the availability of a carrier at short intervals.

Figure 5:
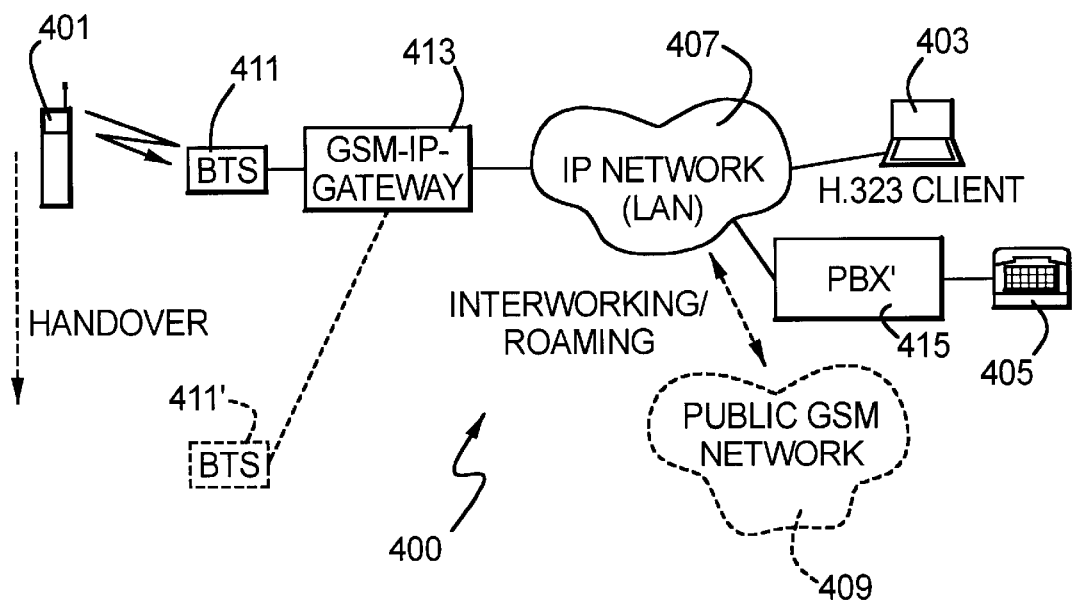
FIG. 5 shows another schematic diagram for the representation of another embodiment of the present invention.

An arrangement similar to FIG. 1 is shown in FIG. 5, which illustrates the application of the invention specifically for the GSM-link of a company's own IP-network. The total arrangement 400 comprises a mobile telephone 401, a laptop 403 and a fixed network-terminal equipment 405 as terminal equipment, a LAN 407 and the public GSM-network 409. The connection between the mobile telephone 401 and the LAN 407 is produced via base station 411 or, after a handover, 411' and a network coupling unit (GSM-IP-gateway) 413— functionally corresponding to the network coupling unit 109. The connection of the fixed network end device 405 to the LAN-network, or respectively, IP-network 407 ensues via an private branch exchange (PBX') 415 according to conventional techniques.

While this invention has been described in connection with what are presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An arrangement for mobile communication comprising:
    at least one mobile radio network;
    at least one mobile radio terminal device;
    an IP-network including a mobility server configured at least for administration of mobility specific subscriber data; and
    a network coupling unit linking the IP-network to the at least one mobile radio network;
    wherein the mobility server is further configured to format match at least one of various protocols, addressing schemes and name schemes of at least one of the IP-network and the at least one mobile radio network.

2. The arrangement according to claim 1, wherein the mobility server is linked to a plurality of local data bases.

3. The arrangement according to claim 2, further comprising at least one data base server for linking the mobility server to the plurality of local data bases.

4. The arrangement according claim 1, wherein the mobility server is further configured for administration of security-related subscriber data as separate security data bases.

5. The arrangement according to claim 1, wherein the mobility server is configured to convert network access identifiers, which are transmitted by connected data terminals, into IP-addresses and store the IP-addresses in a corresponding allocation table.

6. The arrangement according to claim 1, further comprising:
   a radio access network; and
   a plurality of mobile data terminals linked to the radio access network;
   wherein the radio access network is connected to the IP-network to enable the plurality of mobile data terminals to access the at least one mobile radio network via the IP-network without changing an IP-home address.

7. The arrangement according to claim 1, further comprising:
   a radio access server for the connection between the IP-network and the radio access network, the radio access server being connected to the mobility server of the IP-network using a "MAP over IP" protocol.

8. A method for mobile communication between at least one mobile radio device and a mobile radio network that is linked to an IP-network comprising the steps of:

sending an update request from a mobile station to an access server connected to the mobile radio network;

forwarding the update request from the access server to a mobility server located within the IP-network;

determining at least one of a network address identifier and authentication information within the mobility server in response to the update request;

transmitting the authentication information from the mobility server to the mobile station via the access server;

sending an authentication response from the mobile station to the mobility server via the access server in response to the transmitted authentication information;

retrieving a mobile station roaming number from a visitor location register connected to the mobility server;

sending a signal from the mobility server to the mobile station directing the mobile station to begin encrypting payload data to be transmitted; and generating a temporary mobile subscriber identifier for the mobile station based on the mobile station roaming in the mobility server and transmitting the temporary mobile subscriber identifier to the mobile station in order to update location specific information of the mobile station based on the temporary mobile subscriber identifier.

* * * * *